(12) United States Patent
Hsu

(10) Patent No.: US 7,197,763 B2
(45) Date of Patent: Mar. 27, 2007

(54) AUTHENTICATION IN A COMMUNICATION SYSTEM

(75) Inventor: Raymond T. Hsu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 8 days.

(21) Appl. No.: 10/987,509

(22) Filed: Nov. 12, 2004

(65) Prior Publication Data

US 2005/0090232 A1 Apr. 28, 2005

Related U.S. Application Data

(63) Continuation of application No. 10/177,088, filed on Jun. 20, 2002, now abandoned.

(51) Int. Cl.
*G06F 12/16* (2006.01)
*G06F 15/18* (2006.01)

(52) U.S. Cl. .............................. 726/4; 726/14; 726/21; 726/30

(58) Field of Classification Search .................... 726/8, 726/7, 5, 2, 4, 14, 17, 21, 28–30, 11
See application file for complete search history.

(56) References Cited

U.S. PATENT DOCUMENTS

| | | | | |
|---|---|---|---|---|
| 6,085,247 A | * | 7/2000 | Parsons et al. | 709/227 |
| 6,144,848 A | * | 11/2000 | Walsh et al. | 455/419 |
| 6,349,337 B1 | * | 2/2002 | Parsons et al. | 709/227 |
| 6,502,144 B1 | * | 12/2002 | Accarie | 710/8 |
| 6,769,000 B1 | * | 7/2004 | Akhtar et al. | 707/103 R |
| 6,996,631 B1 | * | 2/2006 | Aiken et al. | 709/242 |
| 7,023,868 B2 | * | 4/2006 | Rabenko et al. | 370/419 |
| 7,116,646 B1 | * | 10/2006 | Gustafson et al. | 370/313 |
| 2002/0006137 A1 | * | 1/2002 | Rabenko et al. | 370/466 |
| 2002/0141585 A1 | * | 10/2002 | Carr | 380/255 |
| 2002/0184527 A1 | * | 12/2002 | Chun et al. | 713/201 |
| 2003/0051041 A1 | * | 3/2003 | Kalavade et al. | 709/229 |
| 2005/0220086 A1 | * | 10/2005 | Dowling | 370/352 |

OTHER PUBLICATIONS

Juha Ala-Laurila et seq., "wireless Lan access network architecture for mobile operators", Nov. 2001, IEEE Communication Magazine, pp. 82-89.*

* cited by examiner

*Primary Examiner*—Norman M. Wright
(74) *Attorney, Agent, or Firm*—David J. Huffaker; Sandip Minnas; Thomas Rouse

(57) ABSTRACT

Method and apparatus for providing Cellular Authentication Voice Encryption (CAVE) messages in an Extensible Authentication Protocol (EAP) format. The CAVE messages are sent via an EAP transport mechanism. The Mobile Station (MS) is able to use a common authentication mechanism for other technologies.

4 Claims, 8 Drawing Sheets

| CODE 302 | IDENTIFIER 304 | LENGTH 306 |
|---|---|---|

| TYPE 308 | PAYLOAD 310 |
|---|---|

| TYPE: CAVE 312 | CAVE PAYLOAD 314 |
|---|---|

FIG. 4B

| EAP REQUEST | CAVE CHALLENGE |
| --- | --- |
| EAP RESPONSE | CAVE RESPONSE |

FIG. 5A

| EAP REQUEST | CHAP CHALLENGE |
| --- | --- |
| EAP RESPONSE | NAK |
| EAP REQUEST | CAVE CHALLENGE |
| EAP RESPONSE | CAVE RESPONSE |

FIG. 5B

AUTHENTICATION IN A COMMUNICATION SYSTEM

REFERENCE TO CO-PENDING APPLICATIONS FOR PATENT

This application is a Continuation Application of U.S. application Ser. No. 10/177,088, filed on Jun. 20, 2002 now abandoned which is entitled "Authentication in a Communication System," and currently assigned to the assignee of the present application.

The present Application for Patent is also related to the following co-pending Applications for Patent:

"Inter-working Function for a Communication System," by Raymond Hsu, filed on Jun. 20, 2002 with application Ser. No. 10/176,562, assigned to the assignee hereof and hereby expressly incorporated by reference; and "Key Generation in a Communication System," by Raymond Hsu, filed on Jun. 20, 2002 with application Ser. No. 10/177,017; assigned to the assignee hereof and hereby expressly incorporated by reference.

BACKGROUND

1. Field

The present relates to authentication in a communication system, and more specifically to mechanisms for common authentication and session key distribution using a common format, such as Cellular Authentication Voice Encryption (CAVE) for both voice and data communications.

2. Background

As communication systems and infrastructures expand to provide a variety of voice and data services, the various protocols and authentication procedures incur added complexity, additional use of resources and time delays at set up. A common authentication mechanism for cellular telephone systems is referred to as Cellular Authentication Voice Encryption or "CAVE." Other mechanisms for authentication are implemented in data systems, such as the mechanism referred to as Authentication and Key Agreement or "AKA." When communication systems are expanded to incorporate other services there may be multiple authentication procedures used. There is therefore a need in the art to provide a common format for authentication and set up.

BRIEF DESCRIPTION OF THE DRAWINGS

FIG. 4A and FIG. 4B are fields in an EAP format.

FIG. 5A and FIG. 5B are examples of authentication processing in a system wherein an EAP format supports the CAVE algorithm.

DETAILED DESCRIPTION

Figure 1:
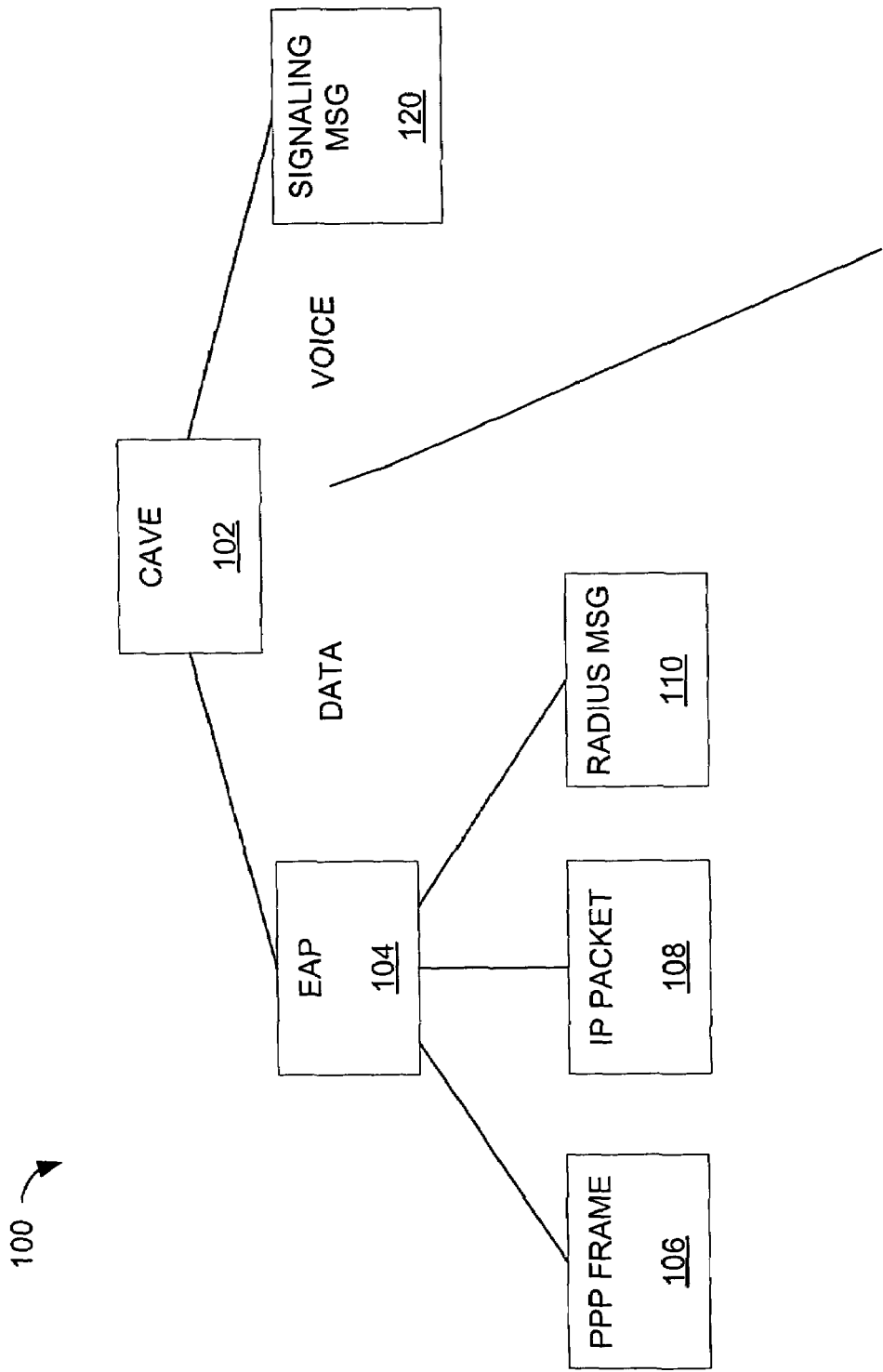
FIG. 1 is an architectural illustration of the extension of the Extensible Authentication Protocol (EAP) to support a Cellular Authentication Voice Encryption (CAVE) algorithm.

The word "exemplary" is used herein to mean "serving as an example, instance, or illustration." Any embodiment described herein as "exemplary" is not necessarily to be construed as preferred or advantageous over other embodiments.

An HDR subscriber station, referred to herein as an access terminal (AT), may be mobile or stationary, and may communicate with one or more HDR base stations, referred to herein as modem pool transceivers (MPTs). An access terminal transmits and receives data packets through one or more modem pool transceivers to an HDR base station controller, referred to herein as a modem pool controller (MPC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link. The communication link through which a modem pool transceiver sends signals to an access terminal is called a forward link.

Authentication is the process of proving the identity of an individual or application in a communication. Such identification allows the service provider to verify the entity as a valid user and also to verify the user for the specific services requested. Authentication and authorization actually have very specific meanings, though the two names are often used interchangeably, and in practice are often not clearly distinguished.

Authentication is the process where a user establishes a right to an identity—in essence, the right to use a name. There are a large number of techniques that may be used to authenticate a user—passwords, biometric techniques, smart cards, certificates.

A name or identity has attributes associated with it. Attributes may be bound closely to a name (for example, in a certificate payload) or they may be stored in a directory or other database under a key corresponding to the name. Attributes may change over time.

Authorization is the process of determining whether an identity (plus a set of attributes associated with that identity) is permitted to perform some action, such as accessing a resource. Note that permission to perform an action does not guarantee that the action can be performed. Note that authentication and authorization decisions can be made at different points, by different entities.

In a cellular network, the authentication feature is a network capability that allows cellular networks to validate the identity of wireless device, thereby reducing unauthorized use of cellular networks. The process is transparent to subscribers. Customers are not required to do anything to authenticate the identity of their phones when they make a call.

Authentication typically involves a cryptographic scheme, wherein the service provider and the user have some shared information and some private information. The shared information is typically referred to as a "shared secret."

The A-Key

The authentication key (A-key) is a secret value that is unique to each individual cellular phone. It is registered with the cellular service provider and stored in the phone and Authentication Center (AC). The A-key is programmed into the phone by the manufacturer. It can also be entered manually by the user, from the wireless device menu, or by a special terminal at the point of sale.

The wireless device and the AC must have the same A-key to produce the same calculations. The primary function of the A-key is to be used as a parameter to calculate the shared secret data (SSD).

The Shared Secret Data (SSD)

The SSD is used as an input for authentication calculations in the wireless device and the AC, and is stored in both places. Unlike the A-key, the SSD may be modified over the network. The AC and the wireless device share three elements that go into the calculation of the SSD: 1) the Electronic Serial Number (ESN); 2) the Authentication Key (A-Key); and 3) a RANDom number for Shared Secret Data calculation (RANDSSD).

The ESN and RANDSSD are transmitted over the network and over the air interface. The SSD is updated when a device makes its first system access, and periodically thereafter. When the SSD is calculated, the result is two separate values, SSD-A and SSD-B. SSD-A is used for authentication. SSD-B is used for encryption and voice privacy.

Depending on the capabilities of the serving system, SSD may be shared or not shared between the AC and serving Mobile Switching Center (MSC). If secret data is shared, it means the AC will send it to the serving MSC and the serving MSC must be capable of executing CAVE. If it is not shared, the AC will keep the data and perform authentication.

The type of sharing affects how an authentication challenge is conducted. An authentication challenge is a message sent to challenge the identify of the wireless device. Basically, the authentication challenge sends some information, typically random number data, for the user to process. The user then processes the information and sends a response. The response is analyzed for verification of the user. With shared secret data, a challenge is handled at the serving MSC. With non-shared secret data, a challenge is handled by the AC. By sharing secret data, the system may minimize the amount of traffic sent and allow challenges to happen more quickly at the serving switch.

Authentication Procedures

In a given system, a Home Location Register (HLR) controls the authentication process by acting as intermediary between the MSC and AC. The serving MSC is set up to support authentication with the mobile's HLR and vice versa.

The device initiates the process by notifying the serving MSC if it is capable of authentication, by setting an authorization field in the overhead message train. In response, the serving MSC starts the registration/authentication process with an Authentication Request.

By sending the Authentication Request, the serving MSC tells the HLR/AC whether it is capable of doing CAVE calculations. The AC controls which of the serving MSC's as well as device capabilities will be used out of those available. When the serving MSC does not have CAVE capability, the SSD cannot be shared between the AC and MSC and therefore all authentication processes are performed in the AC.

The purpose of the Authentication Request (AUTHREQ) is to authenticate the phone and request SSD. The AUTHREQ contains two parameters for authentication, the AUTHR and RAND parameters. When the AC gets the AUTHREQ, it uses the RAND and the last known SSD to calculate AUTHR. If it matches the AUTHR sent in the AUTHREQ then authentication is successful. The return result to the AUTHREQ will contain the SSD if it can be shared.

The Challenge

The Authentication process consists of a challenge and response dialog. If SSD is shared, the dialog runs between the MSC and the device. If SSD is not shared, the dialog runs between the HLR/AC and the device. Depending on the switch type, the MSC may be capable of either a Unique Challenge, a Global Challenge, or both. Some MSCs are currently not capable of global challenge. The Unique Challenge is a challenge that occurs during call attempts only, because it uses the voice channel. Unique challenge presents an authentication to a single device during call origination and call delivery. The Global Challenge is a challenge that occurs during registration, call origination, and call delivery. The Global challenge presents an authentication challenge to all MSs that are using a particular radio control channel. It is called global challenge because it is broadcast on the radio control channel, and the challenge is used by all phones accessing that control channel.

During a challenge, the device responds to a random number provided by the MSC or AC. The device uses the random number and shared secret data stored in the device to calculate a response to the MSC. The MSC also uses the random number and shared secret data to calculate what the response from the device should be. These calculations are done through the CAVE algorithm. If the responses are not the same, service is denied. The challenge process does not increase the amount of time it takes to connect the call. In fact, the call may proceed in some cases, only to be torn down when authentication fails.

As stated hereinabove, the CAVE algorithm is commonly used for cellular communications and therefore, is well used and distributed. Alternate algorithms for authentication are also used. Specifically in data communications a variety of algorithms exist of varying complexity and application. To coordinate these mechanisms, the Extensible Authentication Protocol (EAP) has been developed as a general protocol framework that supports multiple authentication and key distribution mechanisms. The EAP is described in "PPP Extensible Authentication Protocol (EAP)" by L. Blunk et al, RFC 2284, published March 1998.

One such mechanism supported by the EAP as defined in "EAP AKA Authentication" by J. Arkko et al., currently an Internet draft, published February 2002, is the AKA algorithm. There is a need therefore to extend EAP to include the cellular algorithm CAVE. This is desirable to provide back compatibility for new systems and networks.

EAP

The Extensible Authentication Protocol (EAP) is a general protocol for authentication which supports multiple authentication mechanisms. EAP does not select a specific authentication mechanism during link set up and control, but rather postpones this until the authentication procedure begins. This allows the authenticator to request more information before determining the specific authentication mechanism. The authenticator is defined as the end of the link requiring the authentication. The authenticator specifies the authentication protocol to be used in the during link establishment.

FIG. 4A illustrates some of the fields assigned according to EAP. As illustrated, the EAP 300 defines a first field CODE field 302 which identifies the type of message. The IDENTIFIER field 304 allows for correlated responses, wherein the challenge will have an identifier associated with it that is also used by the response to the challenge. The LENGTH field 306 gives the length of the EAP request packet. The TYPE field 308 identifies the type of EAP message that is contained in the PAYLOAD field 310. For example, for AKA authentication, the TYPE field 308 will identify the information as AKA information, and the PAYLOAD field 310 will include an AKA challenge, response, etc.

CAVE Application of EAP

According to one embodiment of the present invention, the EAP is extended to support CAVE authentication. As illustrated in FIG. 1, an architecture for implementing CAVE using EAP allows the CAVE authentication procedures to be applied directly to voice type systems and any other system that supports CAVE. Each block represents an algorithm or messaging type used according to the architecture of the present embodiment. CAVE 102 applies to both the voice network and the data network. For voice communications, CAVE 102 uses a signaling message 120 to facilitate authentication. For data communications, CAVE 102 uses the EAP 104 to facilitate authentication. EAP 104 may be implemented with PPP framing format 106, Internet Protocol (IP) packet format 108, or consistent with a Remote Authentication Dial-In User Service (RADIUS) message format 110. RADIUS is an Internet user authentication described in RFC 2138, "Remote Authentication Dial In User Service (RADIUS)" by C. Rigney et al., published April 1997.

Figure 2:
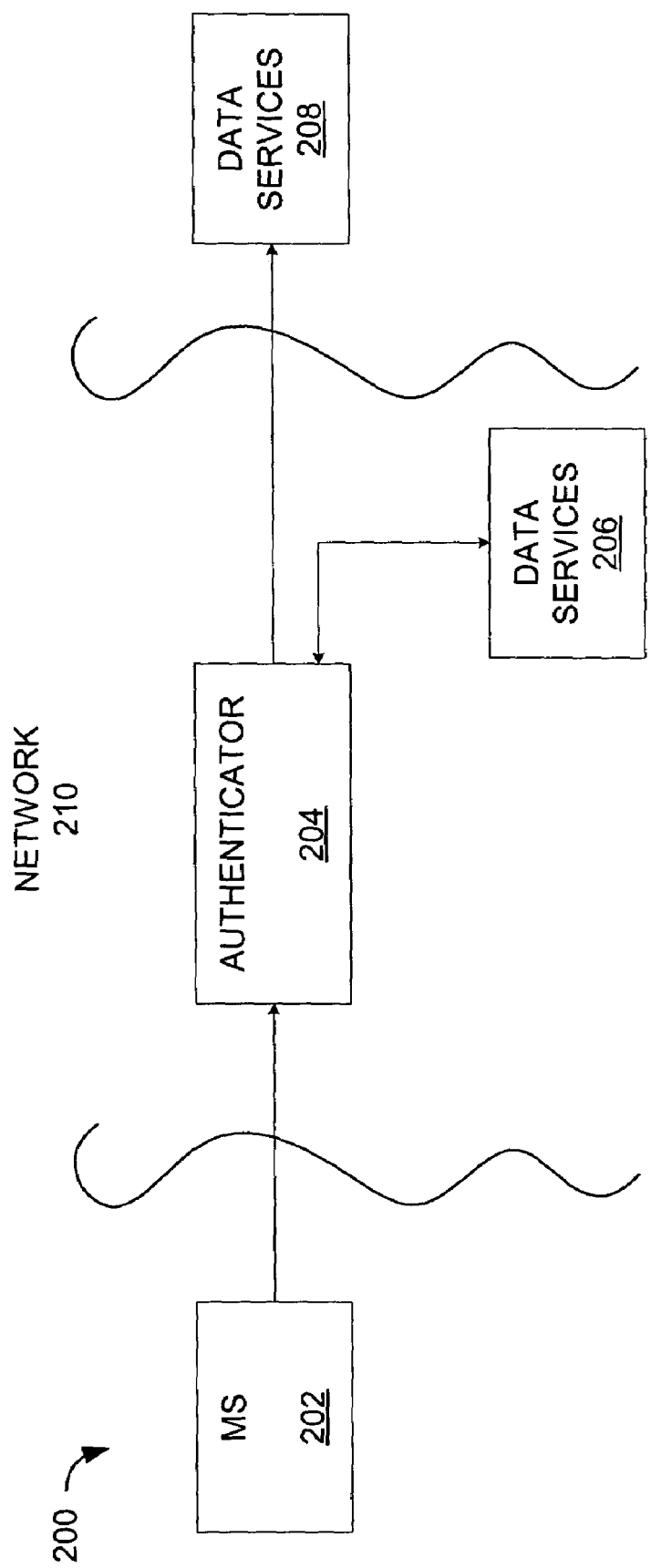
FIG. 2 is a communication system.

FIG. 2 illustrates a communication system 200 employing the architecture of one embodiment. The Mobile Station (MS) 202 is in communication with an authenticator 204. The authenticator initiates authentication of the MS 202 when the MS attempts to access data services 208 (outside of the network 210) or data services 206 (within the network 210). Note that system 200 may include any number of services both in and out of the network 210. The authenticator 204 implements the CAVE algorithm using EAP. The call processing is illustrated in FIG. 3.

Figure 3:
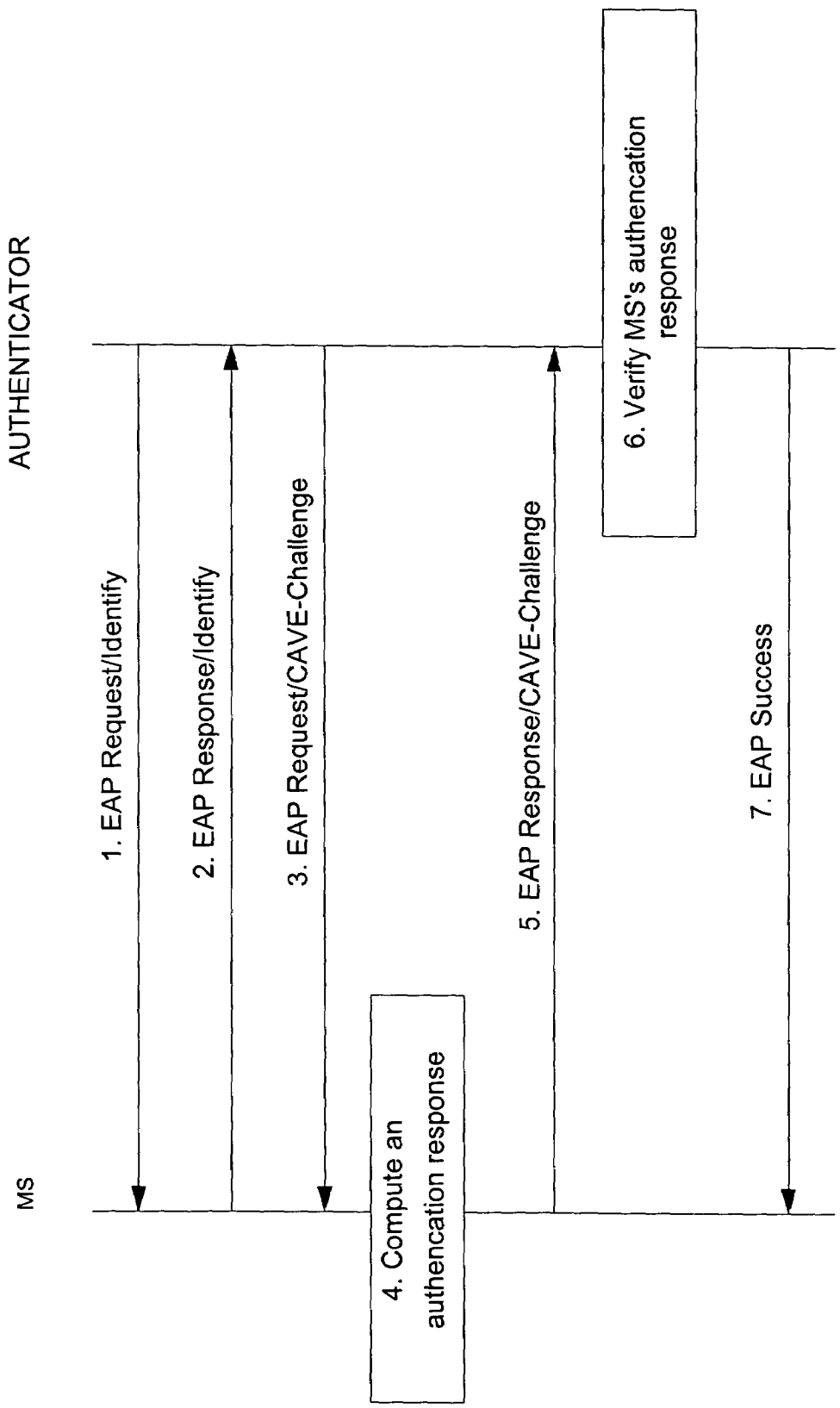
FIG. 3 is a timing diagram of authentication processing in a communication system.

As illustrated in FIG. 3, the authenticator 204 initiates the authentication process with MS 202. The authenticator 204 first sends a request for identification to MS 202 by sending an EAP-Request/Identity message to the MS 202. In response, the MS sends an EAP-Response/Identity message containing the International Mobile Subscriber Identity (IMSI) of the MS 202, or containing an alias name associated with the MS 202. Since the EAP-Response/Identity message is in clear text, i.e., not yet encrypted data, it is vulnerable to eavesdropping over the air during transmission. Since IMSI is considered to be sensitive information to the MS 202, the MS 202 may desire to provide identity using a known alias name. In this case, the authenticator 204 maps the MS 202 alias name to the MS 202 IMSI. An example of an alias name is user@realm (e.g., joe@abc.com).

Based on the MS 202 IMSI, the authenticator 204 determines whether the MS 202 is using CAVE for access authentication. To make such determination, the authenticator 204 sends an "EAP-Request/CAVE-Challenge" message to the MS. The message is sent as an EAP Request message containing a CAVE challenge in the payload. The format for the request is illustrated in FIG. 4B and discussed hereinbelow. The EAP-Request/CAVE-Challenge message contains a challenge, which is a random number generated by the authenticator 204.

The MS 202 then computes an authentication response by applying: 1) secret data; 2) the IMSI of MS 202; and 3) the challenge received, as input to the CAVE algorithm. The result is then provided as an "EAP-Response/CAVE-Challenge" message or response to the authenticator 204. The MS 202 sends the EAP-Response/CAVE-Challenge message to the authenticator 204, wherein the message contains the authentication response. The message does not necessarily contain the MS 202 identify (e.g., IMSI or alias name) and/or the challenge, because the message will use the same message identifier as the EAP-Request/CAVE-Challenge message sent by the authenticator 204 originally. Via the message identifier, the authenticator 204 may associate the MS 202 authentication response with the MS 202 identity and the challenge.

The authenticator 204 then verifies the MS 202 authentication response by comparing it with the expected response. The authenticator 204 may or may not know the MS 202 shared secret. If the authenticator 204 knows, or has knowledge of, the shared secret, the authenticator 204 computes an expected response by using the MS's shared secret, MS's IMSI, and the challenge as input to the CAVE algorithm. If the authenticator 204 does not have the secret, it obtains the expected response from the entity that has the MS 202 shared secret.

If the MS 202 authentication response is the same as the expected response, the MS 202 passes the authentication, and the authenticator 204 sends the "EAP-Success" message, so indicating, to the MS 202. If the MS 202 fails the authentication, the authenticator 204 sends an "EAP-Failure" message (not shown), indicating the authenticator 204 was unable to authenticate the MS 202 for the desired access, to the MS 202.

FIG. 4B illustrates the extension of the EAP for application of CAVE authentication procedures. As illustrated, the TYPE field 308 is extended to TYPE filed 312 which includes a CAVE option. The associated PAYLOAD field 314 is then adapted to include a CAVE message, e.g., CAVE challenge or CAVE response. In this way, the EAP may be used with CAVE authentication procedures. Specifically, the EAP will be the transport mechanism for the negotiations involved in the CAVE authentication. CAVE specifies the messages and the order of messages required for authentication. CAVE further specifies the authentication procedures performed at the MS 202 and the authenticator 204, as well as the information and variables needed for such authentication. The EAP specifies how the information and variables, messages, etc. to implement CAVE authentication are communicated between the MS 202 and the authenticator 204. Once the CAVE option is specified in the EAP message, the content of the CAVE message(s) is invisible to the EAP procedures.

FIGS. 5A and 5B illustrate various scenarios for implementation of CAVE with EAP. In FIG. 5A, the EAP request message from the authenticator 204 is made as a CAVE challenge. In other words, the TYPE field 312 identifies the request as a CAVE message, and the PAYLOAD field 314 contains the CAVE message, which in this case is a CAVE challenge. The MS 202 receives the CAVE challenge via the EAP request message, processes the received information contained in the PAYLOAD field 314 according to the CAVE procedures, and provides the result as a CAVE response back to the authenticator 204 via an EAP response message.

In FIG. 5B, the EAP request message from the authenticator 204 is made according to another authentication procedure referred to as the "MD5-Challenge," which is also known as the Challenge Handshake Authentication Protocol (CHAP). The MS 202 receives the EAP request message but does not support the MD5-Challenge procedures and therefore replies with a Negative Acknowledge message as an EAP response message. Note that the messages sent between the authenticator 204 and the MS 202 are EAP messages. The authenticator 204 receives the NAK via the EAP response message and attempts to authenticate using another type of algorithm. The authenticator 204 may try any number of algorithm types as supported by the EAP format. In this case, the authenticator 204 sends a CAVE challenge in an EAP request message. The MS 202 receives the information, calculates a response, and responds with a CAVE response in an EAP response message. In this way, the authenticator 204 is able to determine the capability of the MS 202 and respond accordingly.

Figure 6:
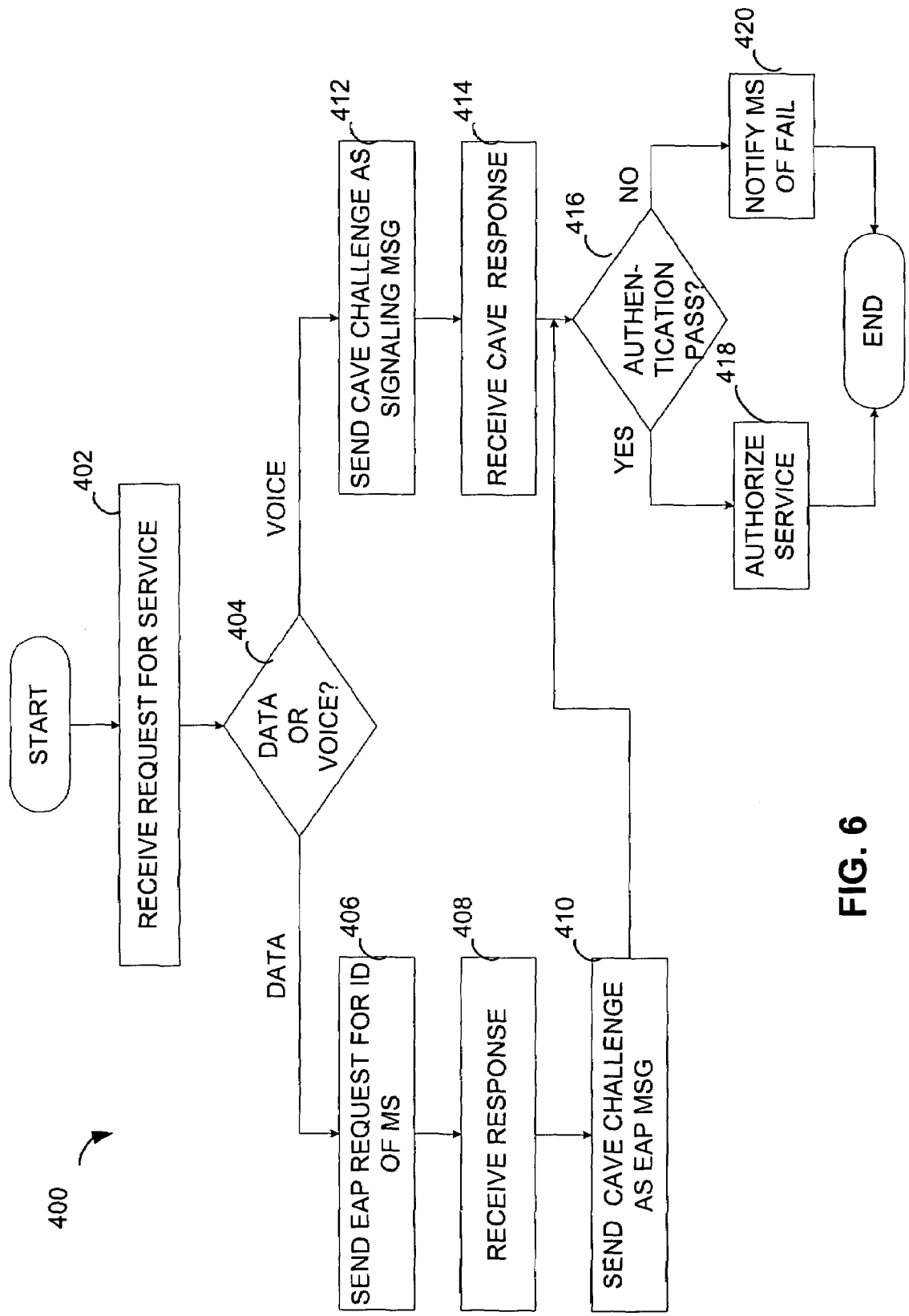
FIG. 6 is a flow diagram of authentication processing at an authenticator.

FIG. 6 is a flow diagram of authentication procedures according to one embodiment at the authenticator 204. The process 400 begins when the authenticator 204 receives a request for a given service at step 402. The request for service may for data services, voice services, or a combination thereof. The authenticator 204 then determines if the communication is voice or data at decision diamond 404. Note that a combination type service, such as Voice over IP (VoIP) is typically treated as a data communication. For data services, processing continues to step 406 to send an EAP request for identification of the MS 202. The authenticator 204 receives a response from the MS 202 at step 408. In response to the MS 202 identification, the authenticator 204 sends a CAVE challenge via an EAP request message at step 410.

The authenticator 204 then determines the status of the authentication procedure at decision diamond 416. If the authentication of MS 202 passed, the authenticator 204 authorizes the service at step 418. If the authentication of MS 202 fails, then the authenticator 204 notifies the MS 202 of a failure to authenticate at step 420.

For voice communications, from decision diamond 404 the authenticator 204 sends a CAVE challenge as a signaling message at step 412. The authenticator 204 receives a CAVE response at step 414. The processing then continues to decision diamond 416 to determine the status of the authentication.

Figure 7:
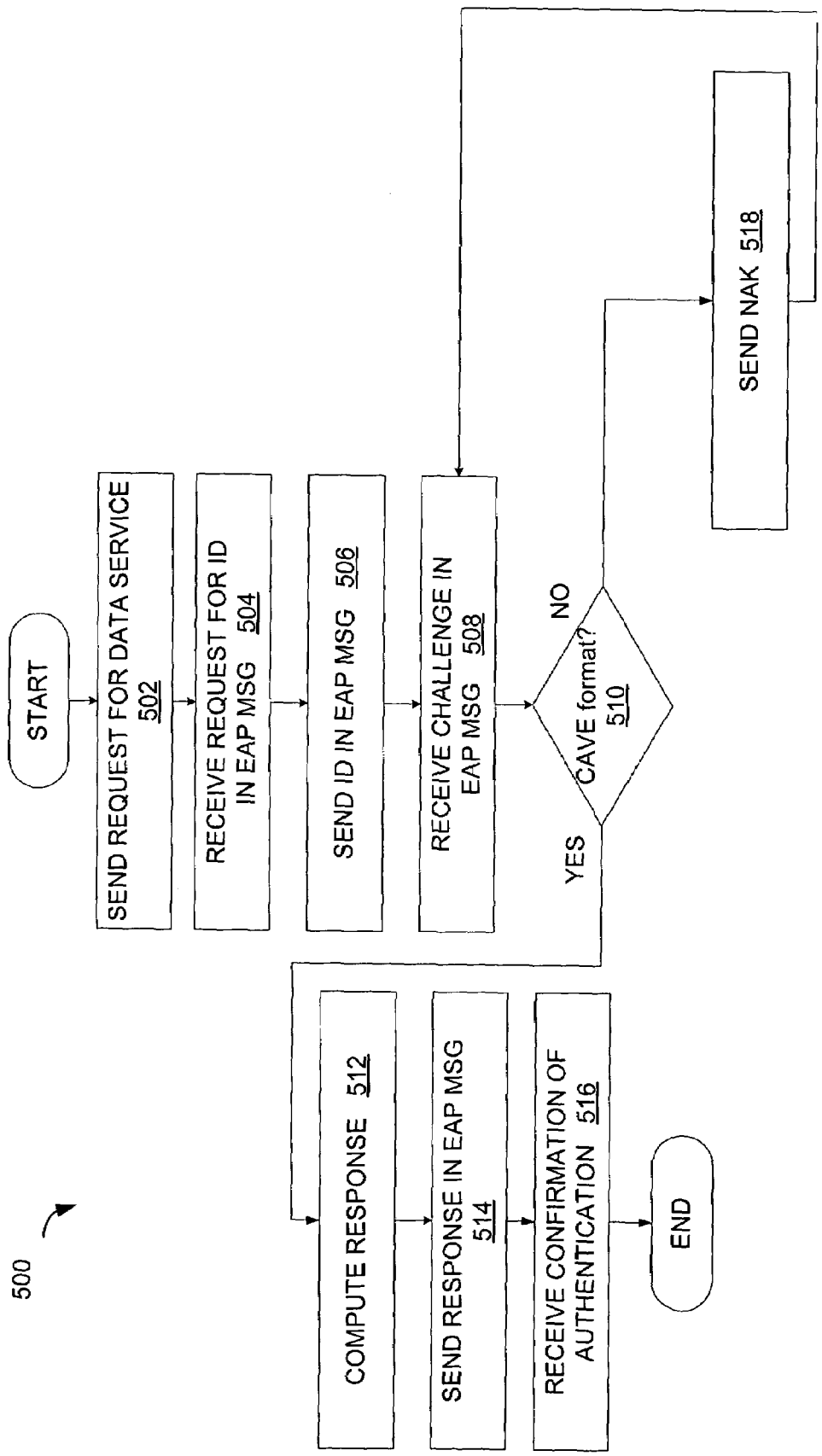
FIG. 7 is a flow diagram of authentication processing at a mobile station.

FIG. 7 is a flow diagram of an authentication procedure at the MS 202. The MS 202 sends a request for data services at step 502. In response thereto, the MS 202 receives a request for identification in an EAP request message at 504. The MS 202 then sends identification information in an EAP response message at step 506. A challenge is received via an EAP request message at step 508. At decision diamond 510, the MS 202 determines the format of the challenge. If the format is according to the CAVE algorithm, then processing continues to step 512; else processing continues to step 518 to send a NAK message via an EAP response. From step 518 processing returns to step 508 to await another challenge. If the challenge was a CAVE challenge, then processing at step 512 computes a response as described hereinabove and consistent with CAVE procedures. The MS 202 sends the response as an EAP response message at step 514. The MS then receives confirmation of the authentication at step 516 and the authentication procedure is complete.

Figure 8:
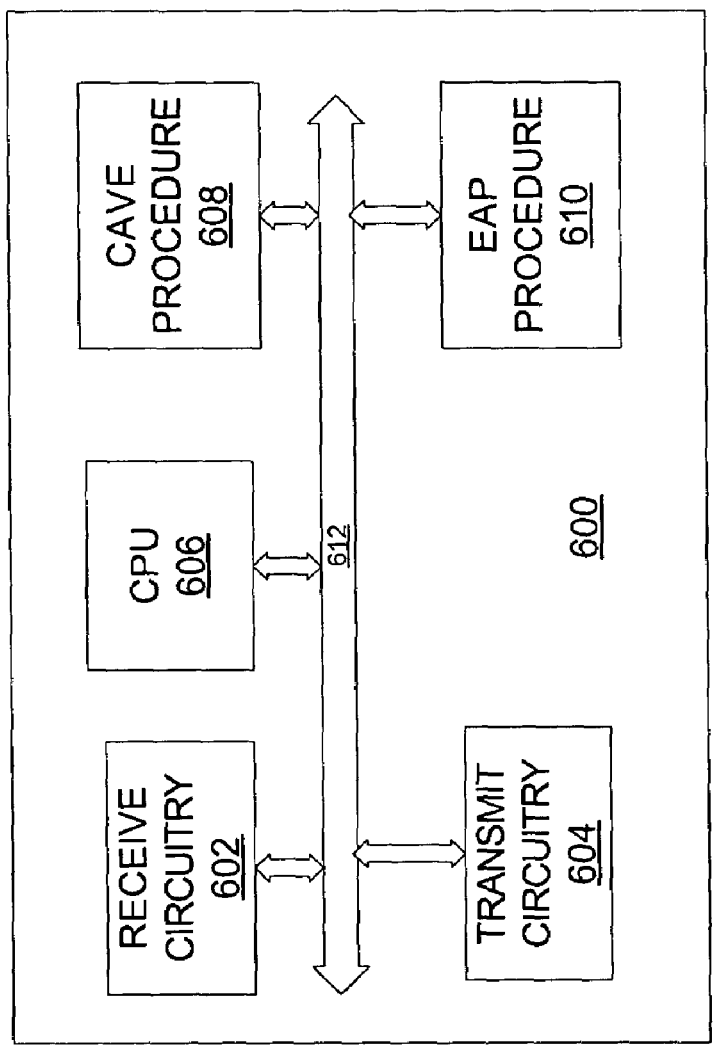
FIG. 8 is a wireless device supporting an extended EAP format that supports the CAVE algorithm.

A wireless device, such as MS 202, is illustrated in FIG. 8. The device 600 includes receive circuitry 602 and transmit circuitry 604 for receiving transmissions and sending transmissions, respectively. The receive circuitry 602 and the transmit circuitry 604 are both coupled to a communication bus 612. The device 600 also includes a Central Processing Unit (CPU) 606 for controlling operations within the device 600. The CPU 606 is responsive to computer-readable instructions stored in memory storage devices within the device 600. Two such storage devices are illustrated as storing the CAVE procedure 608 and the EAP procedure 610. Note that alternate embodiments may implement the procedure in hardware, software, firmware, or a combination thereof. The CPU 606 is then responsive to authentication processing instructions from the CAVE procedure 608. The CPU 606 places the CAVE procedure 608 messages into an EAP format in response to EAP procedure 610. The CPU 606 further processes received EAP messages to extract the CAVE messages therefrom.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for allowing a device capable of both a voice communication and a packet data communication to use a single voice communication authentication format for authentication of either voice communications or packet data communications, the method comprising:
    receiving a request from die device for a given service;
    determining if the given service is for a voice communication or a packet data communication;
    if the given service is a voice communication, then:
        sending a challenge in the voice communication authentication format;
        receiving a response in the voice communication authentication format; and
        performing authentication of the device using the voice communication authentication format;
    if the given service is a packet data communication, then:
        sending a challenge in a packet data communication authentication format;
        receiving a response in die packet data communication authentication format;
        embedding a voice communication challenge into a packet data communication request;
        sending the embedded voice communication challenge; and
        performing authentication of the device using the voice communication authentication format.

2. Apparatus for allowing a device capable of both a voice communication and a packet data communication to use a single voice communication authentication format for authentication of either voice communications or packet data communications, the apparatus comprising:
    means for receiving a request from the device for a given service;
    means determining if the given service is for a voice communication or a packet data communication;
    means for sending a challenge in the voice communication authentication format, receiving a response in the voice communication authentication format, and performing authentication of the device using the voice communication authentication format, if the given service is a voice communication; and
    means for sending a challenge in a packet data communication authentication format, receiving a response in the packet data communication authentication format, embedding a voice communication challenge into a packet data communication request, sending the embedded voice communication challenge and performing authentication of the device using the voice communication authentication format, if the given service is a packet data communication.

3. A method for allowing a device capable of both a voice communication and a packet data communication to use a single voice communication authentication format for authentication of either voice communications or packer data communications, the method comprising:
    sending a request for packet data services to an authenticator;
    receiving a request for identification in a packet data format;
    sending identification to the authenticator in the packet data format;
    receiving a challenge;
    determining whether the received challenge is formatted according to a voice communication authentication format;
    if the received challenge is not formatted according to the voice communication authentication format, then sending a negative acknowledgment in the packet data format; and
    if the received challenge is formatted according to the voice communication authentication format, then:
        computing a response consistent with the voice communication authentication format; and
        sending the response in a packet data format.

4. Apparatus for allowing a device capable of both a voice communication and a packet data communication to use a single voice communication authentication format for authentication of either voice communications or packet data communications, the apparatus comprising:
    means for sending a request for packet data services to an authenticator;
    means for receiving a request for identification in a packet data format;
    means for sending identification to the authenticator in the packet data format;
    means for receiving a challenge;
    means for determining whether the received challenge is formatted according to a voice communication authentication format;
    means for sending a negative acknowledgment in the packet data format if the received challenge is not formatted according to the voice communication authentication format; and
    means for computing a response consistent with the voice communication authentication format, and sending the response in a packet data format if the received challenge is formatted according to the voice communication authentication format.

* * * * *

UNITED STATES PATENT AND TRADEMARK OFFICE
CERTIFICATE OF CORRECTION

PATENT NO. : 7,197,763 B2
APPLICATION NO. : 10/987509
DATED : March 27, 2007
INVENTOR(S) : Raymond T. Hsu It is certified that error appears in the above-identified patent and that said Letters Patent is hereby corrected as shown below:

At Column 9, Line 28, in Claim 1, change "receiving a request from die device for a given service" to read as --receiving a request from the device for a given service--.

At Column 9, Line 41, in Claim 1, change "receiving a response in die packet data communication" to read as --receiving a response in the packet data communication--.

Signed and Sealed this
Fifth Day of February, 2013

Teresa Stanek Rea
*Acting Director of the United States Patent and Trademark Office*